(12) United States Patent
Mio et al.

(10) Patent No.: US 9,531,007 B2
(45) Date of Patent: Dec. 27, 2016

(54) PRODUCTION APPARATUS AND PRODUCTION METHOD FOR ELECTRIC STORAGE MATERIAL

(71) Applicant: JTEKT Corporation, Osaka-shi (JP)

(72) Inventors: Takumi Mio, Kariya (JP); Koji Nishi, Anjo (JP); Junya Fujita, Toyota (JP); Yoshifumi Fukaya, Obu (JP); Takafumi Fujii, Okazaki (JP); Kazuya Suzuki, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/172,299

(22) Filed: Feb. 4, 2014

(65) Prior Publication Data

US 2014/0225043 A1    Aug. 14, 2014

(30) Foreign Application Priority Data

Feb. 12, 2013 (JP) ................................. 2013-024366
Nov. 15, 2013 (JP) ................................. 2013-236709

(51) Int. Cl.
*B01J 19/10* (2006.01)
*H01M 4/62* (2006.01)
(Continued)

(52) U.S. Cl.
CPC .............. *H01M 4/622* (2013.01); *B01J 19/10* (2013.01); *H01M 4/04* (2013.01); *H01M 4/139* (2013.01);
(Continued)

(58) Field of Classification Search
CPC ........ H01M 4/622; H01M 4/04; H01M 4/139; H01M 4/52; H01M 4/624; H01M 10/0525; H01M 2004/021; B01J 19/10; Y02P 70/54; Y02E 60/122
(Continued)

(56) References Cited

U.S. PATENT DOCUMENTS 5,707,763 A    1/1998 Shimizu et al.
6,019,802 A    2/2000 Ishizuka et al.
(Continued)

FOREIGN PATENT DOCUMENTS

DE    10 2011 077 130 A1    12/2012
EP    0 735 093 A1    10/1996
(Continued)

OTHER PUBLICATIONS

U.S. Appl. No. 14/584,251, filed Dec. 29, 2014, Mio et al.
(Continued)

*Primary Examiner* — Mark Kopec
*Assistant Examiner* — Danny N Kang
(74) *Attorney, Agent, or Firm* — Oblon, McClelland, Maier & Neustadt, L.L.P.

(57) ABSTRACT

A production apparatus for an electric storage material includes a dissolution device that dissolves a thickener in a solvent by applying vibration to the solvent, and a kneading device that kneads a solution of the thickener having an adjusted viscosity and an active substance. The thickener is dissolved in the solvent, and a powder of the active substance and the like are dispersed and kneaded in the solution of the thickener having the adjusted viscosity. Thus, kneading can be performed in a short time, and damage to the active substance can be suppressed.

8 Claims, 5 Drawing Sheets (51) Int. Cl.
  *H01M 4/04* (2006.01)
  *H01M 4/139* (2010.01)
  *H01M 10/0525* (2010.01)
  *H01M 4/02* (2006.01)

(52) U.S. Cl.
  CPC ............ *H01M 4/62* (2013.01); *H01M 4/624* (2013.01); *H01M 10/0525* (2013.01); *H01M 2004/021* (2013.01); *Y02E 60/122* (2013.01); *Y02P 70/54* (2015.11)

(58) Field of Classification Search
  USPC .............. 252/500, 506, 182.1; 422/128
  See application file for complete search history.

(56) References Cited

U.S. PATENT DOCUMENTS

| | | | |
|---|---|---|---|
| 6,562,936 B1 * | 5/2003 | Hatono | .......... B29C 47/38 528/196 |
| 2004/0173439 A1 | 9/2004 | Abdel-Hadi et al. | |
| 2009/0117461 A1 | 5/2009 | Shembel et al. | |
| 2009/0279230 A1 | 11/2009 | Eilertsen et al. | |
| 2010/0230641 A1 | 9/2010 | Oki et al. | |
| 2011/0052984 A1 | 3/2011 | Nakamura et al. | |
| 2012/0135291 A1 | 5/2012 | Patoux et al. | |
| 2012/0187347 A1 | 7/2012 | Eilertsen et al. | |

FOREIGN PATENT DOCUMENTS

| | | | |
|---|---|---|---|
| EP | 1 881 546 A2 | 1/2008 | |
| EP | 1 881 546 A3 | 1/2008 | |
| GB | 818489 A | 8/1959 | |
| JP | 8-190912 A | 7/1996 | |
| JP | EP 0735093 A1 * | 10/1996 | ............ C08F 259/08 |
| JP | 2000-306598 | 11/2000 | |
| JP | 2000306598 A * | 11/2000 | |
| JP | 2001-328813 A | 11/2001 | |
| JP | 2005-276502 | 10/2005 | |
| JP | 2006-310120 | 11/2006 | |
| JP | 2008-34377 A | 2/2008 | |
| JP | 4104645 | 6/2008 | |
| JP | 2011-228062 | 11/2011 | |
| JP | 4941692 | 5/2012 | |
| WO | WO 2004/011131 A2 | 2/2004 | |
| WO | WO 2007/126400 A1 | 11/2007 | |
| WO | WO 2011/001848 A1 | 1/2011 | |
| WO | WO 2013/129254 A1 | 9/2013 | |
| WO | WO 2013/166598 A1 | 11/2013 | |
| WO | WO 2014/016921 A1 | 1/2014 | |

OTHER PUBLICATIONS

U.S. Appl. No. 14/628,863, filed Feb. 23, 2015, Fujii et al.
U.S. Appl. No. 14/629,710, filed Feb. 24, 2015, Mio et al.
Extended European Search Report issued May 13, 2015 in Patent Application No. 15156483.8.
Extended European Search Report issued May 20, 2014, in European Patent Application No. 14154089.8.
European Office Action issued Mar. 1, 2016 in Patent Application 15 156 483.8.
U.S. Appl. No. 14/851,264, filed Sep. 11, 2015, Mio et al.
Extended European Search Report issued Jul. 15, 2015 in Patent Application No. 15156220.4.

* cited by examiner

PRODUCTION APPARATUS AND PRODUCTION METHOD FOR ELECTRIC STORAGE MATERIAL

INCORPORATION BY REFERENCE

The disclosure of Japanese Patent Applications No. 2013-024366 and No. 2013-236709 filed on Feb. 12, 2013 and Nov. 15, 2013, each including the specification, drawings and abstract, are incorporated herein by reference in their entireties.

BACKGROUND OF THE INVENTION

1. Field of the Invention

The invention relates to a production apparatus and a production method for an electric storage material.

2. Description of Related Art

Recently, a lithium ion secondary battery has been used in a hybrid vehicle, an electric vehicle or the like. Each of electrodes in the lithium ion secondary battery is produced by kneading a powder of an active substance and the like in a solution of a thickener to produce a slurry of an active material (electric storage material), applying the produced slurry to a base material such as an aluminum foil, and drying the slurry.

As described in Japanese Patent No. 4941692, the active substance is produced by applying microwaves to a precursor of the active substance, and maturing the precursor at a low temperature. Further, the slurry of the active material is produced by introducing the thickener, a solvent, the powder of the active substance, and the like together into a kneading device, agitating them so that the powder of the active substance and the like are dispersed while the thickener is dissolved in the solvent, and kneading the slurry of the active material until a predetermined viscosity is obtained.

At this stage, in order to increase the efficiency in dispersing the powder of the active substance and the like in the slurry, ultrasonic waves are applied to the slurry so as to vibrate the powder of the active substance and the like, as described in, for example, Japanese Patent No. 4104645, Japanese Patent Application Publication No. 2011-228062, Japanese Patent Application Publication No. 2006-310120 and Japanese Patent Application Publication No. 2005-276502. Further, in order to increase the efficiency in utilizing the powder of the active substance and the like in the slurry, microwaves are applied to the slurry so as to heat the powder of the active substance and the like, as described in, for example, Japanese Patent Application. Publication No. 2000-306598.

In general, it is difficult to dissolve the thickener in the solvent. For example, in the case where a powder of carboxymethylcellulose is used as the thickener, and water is used as the solvent, the powder of carboxymethylcellulose is gelled when it absorbs the water. Since the powder of carboxymethylcellulose is gelled, it becomes difficult for the water to deeply penetrate into the powder of carboxymethylcellulose. As a result, it is difficult to dissolve all the powder of carboxymethylcellulose in the water. Thus, in the conventional case where the thickener, the solvent, the powder of the active substance and the like are introduced together into the kneading device, and are agitated and kneaded, the kneading time tends to become long. If the kneading time becomes long, the active substance is subjected to shearing force for a long time, and therefore, the active substance may be damaged, and thus, it may be difficult to obtain high battery performance.

In general, as the viscosity of the slurry of the active material becomes lower, the initial battery performance becomes higher, but it becomes more difficult to appropriately perform an applying step and a drying step, which are steps performed after the kneading step. Thus, the viscosity of the slurry of the active material is adjusted to a predetermined value in view of the balance between the initial battery performance and the efficiency in performing the applying and drying steps. The adjustment of the viscosity of the slurry of the active material is performed by cutting molecular chains of the thickener with the use of shear energy that is obtained during the kneading of the powder of the active substance and the like in the solution of the thickener. Accordingly, production efficiency can be increased by kneading the powder of the active substance and the like at a high speed. However, if the kneading is performed at a high speed, the active material may be damaged, and it may be difficult to ensure high battery performance.

SUMMARY OF THE INVENTION

An object of the present invention is to provide a production apparatus for an electric storage material and a production method for an electric storage material, which can suppress damage to an active substance, and can increase production efficiency.

A production apparatus for an electric storage material according to an aspect of the present invention is a production apparatus for an electric storage material, which produces an electric storage material that contains at least a thickener and an active substance. The production apparatus for an electric storage material includes a dissolution device that dissolves the thickener in a solvent by applying vibration to the solvent, and a kneading device that kneads a solution of the thickener, and the active substance.

If the dissolution of the thickener in the solution, the dispersion of a powder of the active substance and the like, and the viscosity adjustment for these materials are all performed in one kneading device, the dissolution of the thickener and the viscosity adjustment are particularly time-consuming. Thus, since the active substance is subjected to shearing force for a long time, the active substance may be damaged. However, in the production apparatus for an electric storage material according to the above-described aspect, the device that dissolves the thickener in the solvent, and the device that disperses and kneads the powder of the active substance and the like in the solution of the thickener having the adjusted viscosity are provided separately. Accordingly, the time during which the active substance is subjected to the shearing force can be shortened, and thus, it is possible to suppress damage to the active substance. Further, it is possible to perform the dissolution of the thickener, which is particularly time-consuming, in parallel with the dispersion and the kneading of the powder of the active substance and the like. Thus, it is possible to increase the production efficiency.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A production apparatus for an electric storage material according to this embodiment constitutes an apparatus for producing electrodes (a positive electrode and a negative electrode) in, for example, a lithium ion secondary battery. Each of the electrodes in the lithium ion secondary battery is produced by applying a slurry of an active material as an electric storage material to a base member such as an aluminum foil or a copper foil, and then drying the slurry. The production apparatus for an electric storage material in this embodiment is an apparatus for producing a slurry of an active material.

Specific examples of the active material will be described. In the case of the positive electrode, a lithium-nickel oxide or the like (solid content) as an active substance, N-methylpyrrolidone or the like (liquid content) as a solvent, acetylene black or the like as a conductive agent, and polyvinylidene fluoride or the like as a binder are used. In the case of the negative electrode, graphite or the like (solid content) as the active substance, water (liquid content) as the solvent, carboxymethylcellulose or the like as a thickener, and a styrene-butadiene rubber (SBR), polyacrylic acid or the like as the binder are used.

Figure 1:
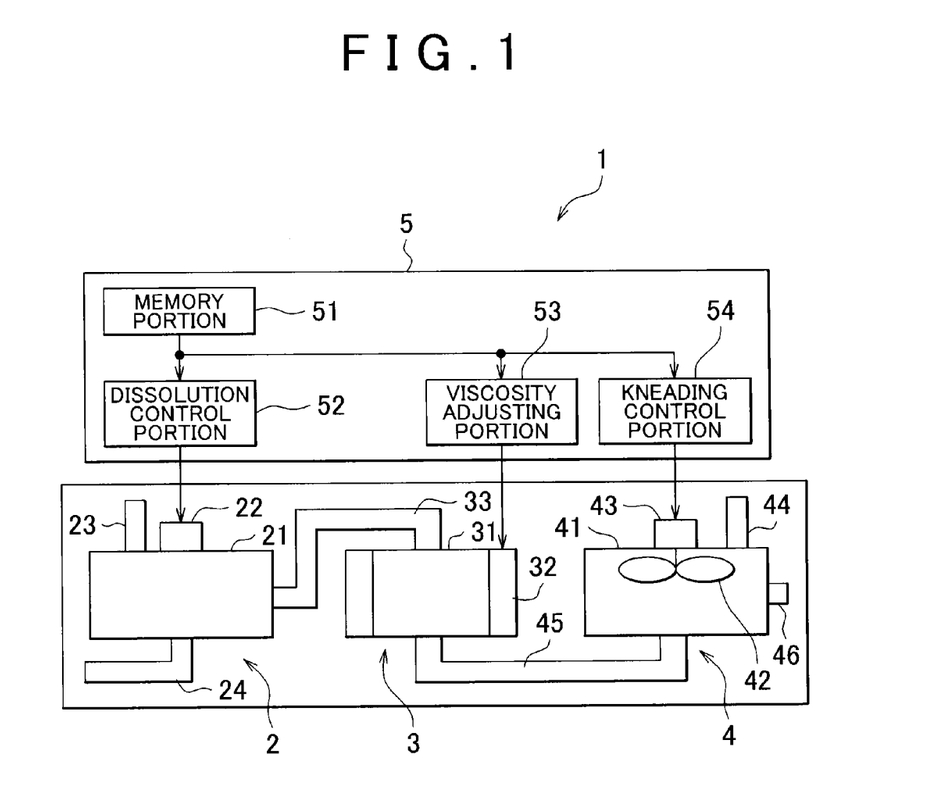
FIG. 1 is a schematic configuration diagram showing a production apparatus for an electric storage material according to an embodiment of the present invention.

The production apparatus for an electric storage material according to this embodiment will be described with reference to FIG. 1. A production apparatus 1 for an electric storage material includes a dissolution device 2, a viscosity adjusting device 3, a kneading device 4, a production control device 5 and the like.

The dissolution device 2 is a device that dissolves a thickener in a solvent. The dissolution device 2 includes a housing 21, a microwave device 22 and a hopper 23, a supply pipe line 24 and the like. The housing 21 is formed in a hollow cylindrical shape. The microwave device 22 includes a magnetron, and is disposed on an upper surface of an upper portion of the housing 21. The hopper 23 that houses the thickener is provided to project from the upper surface of the housing 21 so that the thickener can be supplied into the housing 21. The supply pipe line 24 is connected to a lower surface of the housing 21 so that the solvent can be supplied into the housing 21.

The viscosity adjusting device 3 is a device that adjusts the viscosity of the solution of the thickener. The viscosity adjusting device 3 includes a housing 31, an ultrasonic device 32, an introduction pipe line 33 and the like. The housing 31 is formed in a hollow cylindrical shape. The ultrasonic device 32 is disposed at an outer periphery of the housing 31. In the ultrasonic device 32, an ultrasonic wave generating element, such as a piezoelectric element, is in close contact with, and is secured to an outer peripheral surface of the housing 31. The introduction pipe line 33 is disposed between a peripheral wall of the housing 21 of the dissolution device 2 and an upper surface of the housing 31 so that the solution of the thickener can be introduced from the housing 21 of the dissolution device 2 into the housing 31.

The kneading device 4 is a device that kneads the solution of the thickener having the adjusted viscosity, and the active substance. The kneading device 4 includes a housing 41, agitating blades 42, a drive motor 43, a hopper 44, an introduction pipe line 45, a drainage pipe line 46 and the like. The housing 41 is formed in a hollow cylindrical shape. A rotary shaft for the agitating blades 42 is supported at a center portion of an upper surface of the housing 41 so that the agitating blades 42 are rotatable within the housing 41. The drive motor 43 is secured to an upper surface of an upper portion of the housing 41, and a motor shaft of the drive motor 43 is coupled to the rotary shaft for the agitating blades 42.

The hopper 44 that houses the powder of the active substance or the like is provided to project from the upper surface of the housing 41 so that the powder of the active substance can be supplied into the housing 41. The introduction pipe line 45 is disposed between a lower surface of the housing 31 of the viscosity adjusting device 3 and a lower surface of the housing 41 so that the solution of the thickener can be supplied from the housing 31 of the viscosity adjusting device 3 into the housing 41. The drainage pipe line 46 is disposed at an outer peripheral surface of the housing 41 so that the slurry of the active material can be drained to the outside.

The production control device 5 includes a memory portion 51, a dissolution control portion 52, a viscosity adjusting portion 53, a kneading control portion 54 and the like. The memory portion 51 stores data indicating a relationship between a viscosity of the solution of the thickener and an application time during which microwaves are applied (i.e., a thickener dissolution time) (refer to FIG. 3), data indicating a relationship between a viscosity of the slurry of the active material and a viscosity of the solution of the thickener (refer to FIG. 4), data indicating a relationship between a viscosity of the solution of the thickener and an application time during which ultrasonic waves are applied (i.e., an aqueous solution viscosity adjusting time) (refer to FIG. 5), and the other data relating to dissolution control, viscosity adjustment, kneading control and the like.

The dissolution control portion 52 is a control portion that controls the operation of the dissolution device 2. The dissolution control portion 52 produces the solution of the thickener by operating the microwave device 22 so that the microwave device 22 generates microwaves, and the microwaves are applied to the solvent supplied into the housing 21, and thus, the thickener is dissolved in the solvent. That is, the dissolution control portion 52 controls the dissolution of the thickener by applying the microwaves for a predetermined time so that the solution of the thickener has a certain viscosity that is obtained at the time when the thickener is completely dissolved in the solvent.

The viscosity adjusting portion 53 is a control portion that controls the operation of the viscosity adjusting device 3. The viscosity adjusting portion 53 adjusts the viscosity of the solution of the thickener by operating the ultrasonic device 32 so that the ultrasonic device 32 generates ultrasonic waves, and the ultrasonic waves are applied to the solution of the thickener supplied into the housing 31. That is, the viscosity adjusting portion 53 determines the viscosity of the solution of the thickener, based on the final viscosity of the slurry of the active material, and controls the viscosity adjustment by applying the ultrasonic waves for a predetermined time so that the solution of the thickener has the determined viscosity.

The kneading control portion 54 is a control portion that controls the operation of the kneading device 4. The kneading control portion 54 produces the slurry of the active material by driving the drive motor 43 so as to rotate the agitating blades 42 for agitating the solution of the thickener, the active substance and the like, which are supplied into the housing 41. The kneading control portion 54 sets an index for kneading based on a kinetic energy of particles in the active material, a mean free path of the particles in the active material and a kneading time during which the active material are kneaded, as will be detailed later. Further, the kneading control portion 54 sets a condition for kneading so that the set index for kneading becomes equal to or lower than a target value, and controls the kneading of the active material according to the set condition for kneading.

Conventionally, the thickener, the solvent, the powder of active substance and the like are introduced together into the kneading device, and are then agitated. Thus, the dissolution of the thickener, the dispersion of the powder of the active substance and the like, and the viscosity adjustment for these materials are all performed in one kneading device. Thus, since the active substance is subjected to shearing force for a long time, the active substance may be damaged. However, in this embodiment, the above-described processes are performed, respectively, in the dissolution device 2 that dissolves the thickener in the solvent, the viscosity adjusting device 3 that adjusts the viscosity of the solution of the thickener and the kneading device 4 that disperses and kneads the powder of the active substance and the like in the solution of the thickener having the adjusted viscosity. Accordingly, the time during which the active substance is subjected to the shearing force can be shortened, and thus, it is possible to suppress damage to the active substance. Thus, high battery performance can be obtained. Further, it is possible to perform, in parallel, the dissolution of the thickener, which is particularly time-consuming, the adjustment of the viscosity of the solution of the thickener, and the dispersion and the kneading of the powder of the active substance and the like. Thus, it is possible to increase the production efficiency.

Figure 2:
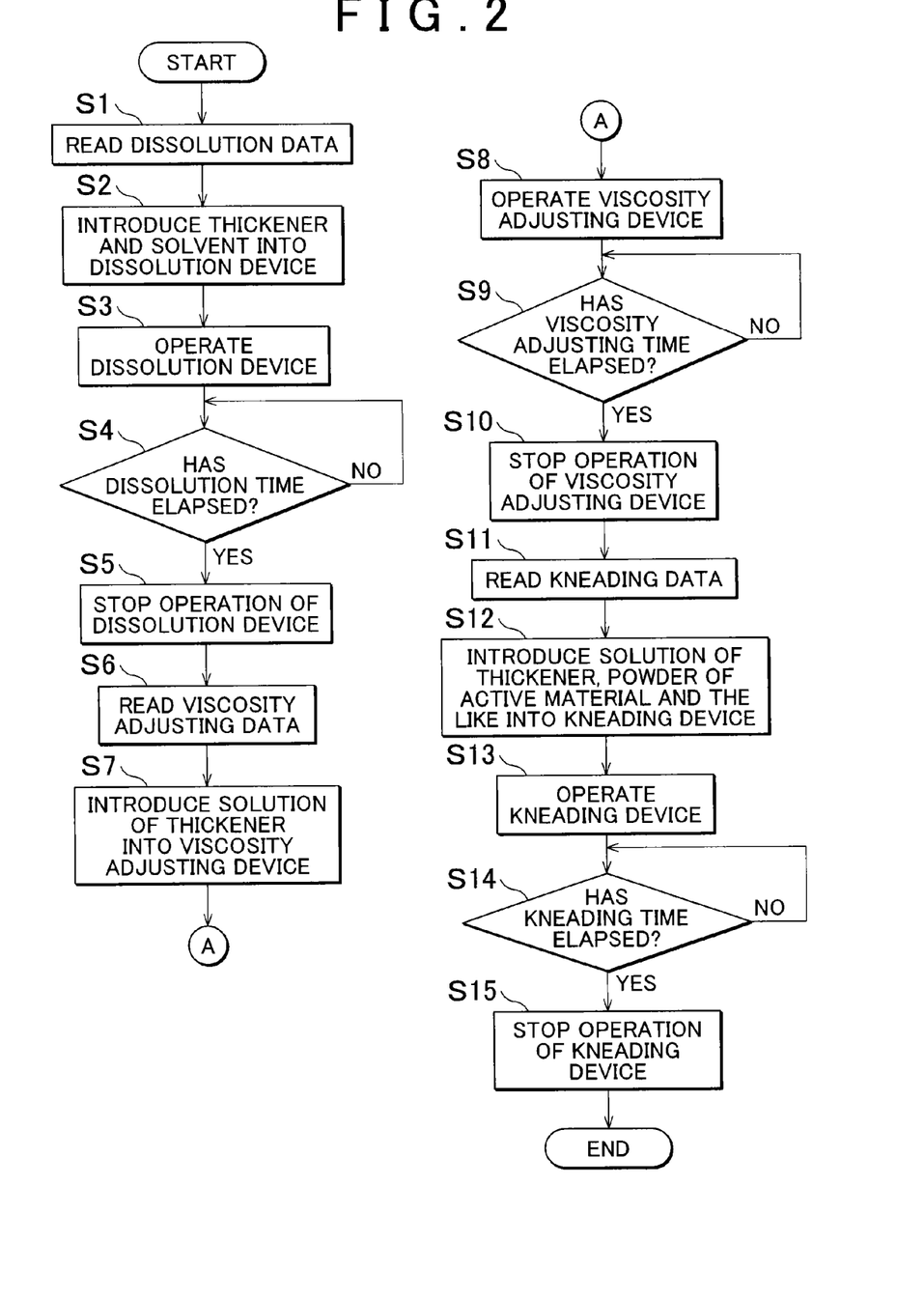
FIG. 2 is a flowchart showing processing executed by a production control device in the production apparatus for an electric storage material according to the embodiment of the present invention.

Next, the processing executed by the production control device 5 will be described with reference to FIG. 2. As shown in FIG. 2, the data relating to the dissolution of the thickener is read (step S1), and the thickener and the solvent are introduced into the dissolution device 2 (step S2). Further, the dissolution device 2 is operated (step S3), and it is determined whether a predetermined dissolution time has elapsed (step S4). If the predetermined dissolution time has elapsed, the operation of the dissolution device 2 is stopped (step S5).

Specifically, the dissolution control portion 52 reads data relating to the masses of the thickener and the solvent and data relating to the dissolution time, from the memory portion 51, and introduces a predetermined amount of the thickener into the housing 21 through the hopper 23, and introduces a predetermined amount of the solvent into the housing 21 through the supply pipe line 24. Further, the dissolution control portion 52 operates the microwave device 22 to apply microwaves to the solvent in the housing 21 for a predetermined dissolution time.

Figure 3:
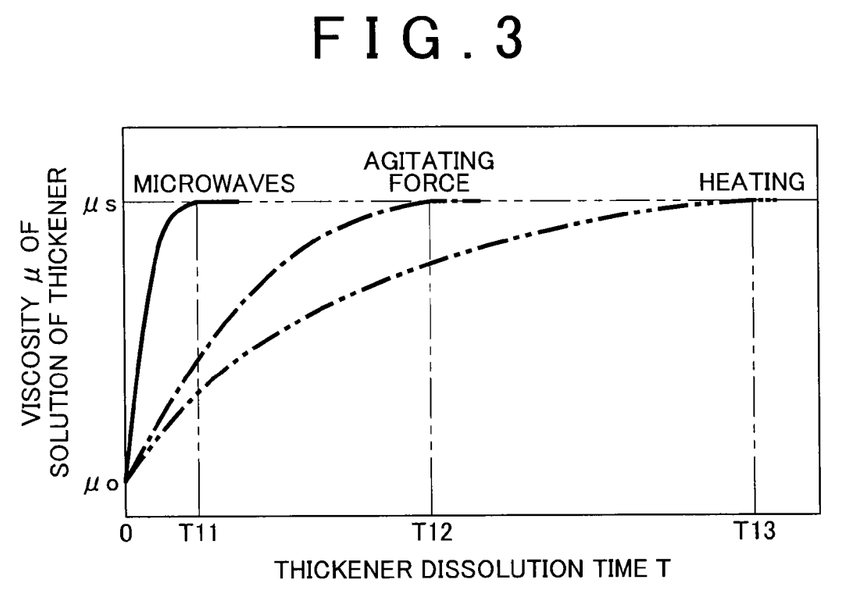
FIG. 3 is a diagram showing changes with time in a viscosity of a solution of a thickener obtained with the use of microwaves, the viscosity of the solution of the thickener obtained with the use of agitating force, and the viscosity of the solution of the thickener obtained with the use of heating.

The dissolution of the thickener in the solvent will be described. As shown in FIG. 3, when an initial viscosity of the solvent is $\mu o$, the viscosity of the solution of the thickener at the time when the thickener is completely dissolved in the solvent after the thickener is introduced into the solvent becomes $\mu s$ that is constant. Thus, the degree of solubility of the thickener with respect to the solvent can be determined by monitoring the viscosity of the solution of the thickener.

Although the thickener may be dissolved in the solvent by agitation as in the conventional case, the solvent is vibrated by microwaves so as to dissolve the thickener in the solvent in this embodiment. As shown in FIG. 3, it has been confirmed in experiments that the thickener can be efficiently dissolved in the solvent with the use of the microwaves, as compared to the dissolution of the thickener in the solvent by agitation or the dissolution of the thickener in the solvent by heating. That is, in the case where the microwaves are used, the time T required for adjusting the viscosity of the solution of the thickener to $\mu s$, which is a target value of the solution of the thickener, can be shortened to T11 (<T12<T13), while the time T is T12 in the case where agitating force is used, and the time T is T13 (>T12) in the case where heating is used. Thus, electric power required for dissolution with the use of the microwaves is lower than electric power required for dissolution with the use of the agitating force.

The dissolution with the use of the microwaves is performed by applying the microwaves to the solvent so that the solvent is vibrated and the solvent penetrates into the thickener. It is preferable that the frequency band of the microwaves should be a frequency band in which the solvent can readily absorb the energy of the microwaves. Accordingly, in the case of using, for example, water as the solvent, a frequency band from 0.9 to 400 GHz is used. It is noted here that the microwaves described in this embodiment are microwaves that are generated by equipment such as a microwave oven.

Then, data relating to the viscosity adjustment are read (step S6), and the solution of the thickener is introduced into the viscosity adjusting device 3 (step S7). Further, the viscosity adjusting device 3 is operated (step S8), and it is determined whether a predetermined viscosity adjusting time has elapsed (step S9). If the predetermined viscosity adjusting time has elapsed, the operation of the viscosity adjusting device 3 is stopped (step S10). Specifically, the viscosity adjusting portion 53 introduces the solution of the thickener from the housing 21 of the dissolution device 2 into the housing 31 through the introduction pipe line 33. Then, the ultrasonic device 32 is operated so as to apply ultrasonic waves to the solution of the thickener in the housing 31 for the predetermined viscosity adjusting time.

Figure 4:
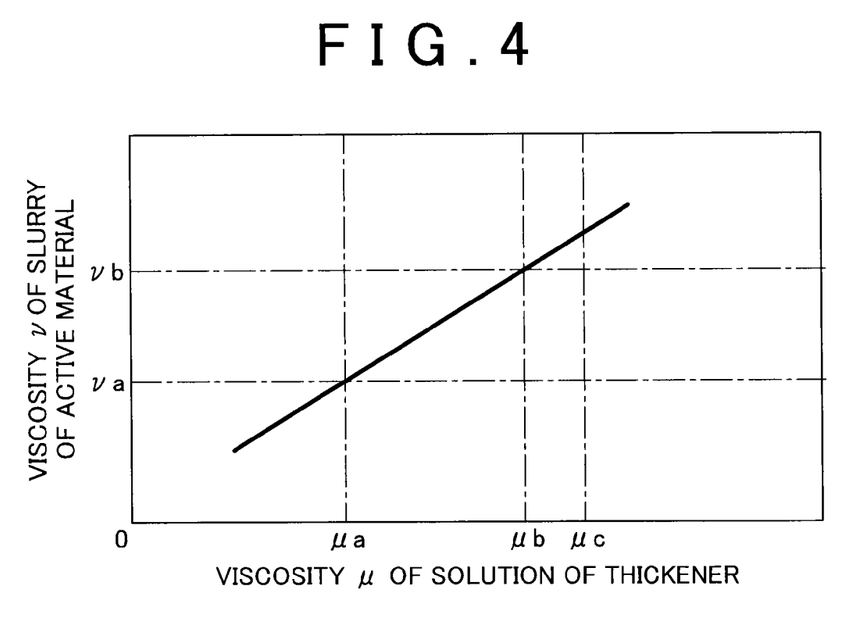
FIG. 4 is a diagram showing a relationship between the final viscosity of the slurry of the active material and the viscosity of the solution of the thickener.

The adjustment of the viscosity of the solution of the thickener will be described. As shown in FIG. 4, a final viscosity $v$ of the slurry of the active material is proportional to the viscosity $\mu$ of the solution of the thickener. Thus, by adjusting the viscosity $\mu$ of the solution of the thickener to a predetermined value, the viscosity ν of the slurry of the active material can be adjusted into a predetermined range of νa to νb that can be determined in view of the balance between the initial battery performance and the efficiency in performing the applying and drying steps.

The viscosity μ of the solution of the thickener is adjusted into a predetermined viscosity range of μa to μb as shown in FIG. 4, or is adjusted to a value μc that is higher than the upper limit value μb of the above-described predetermined range, by a predetermined value. By adjusting the viscosity μ of the solution of the thickener into the predetermined range of μa to μb, which is close to the final viscosity ν of the slurry of the active material, it is possible to shorten the viscosity adjusting time required for obtaining the final viscosity ν of the slurry of the active material by kneading the solution of the thickener with the powder of the active substance and the like. Thus, it is possible to shorten the time during which the active substance is subjected to the shearing force, and accordingly, it is possible to decrease the degree of damage to the active substance. Further, even when the viscosity μ of the solution of the thickener becomes the value μc that is higher than the upper limit value μb by the predetermined value, the viscosity μ can be easily readjusted into the predetermined viscosity range of μa to μb, by adding the solvent afterward.

Figure 5:
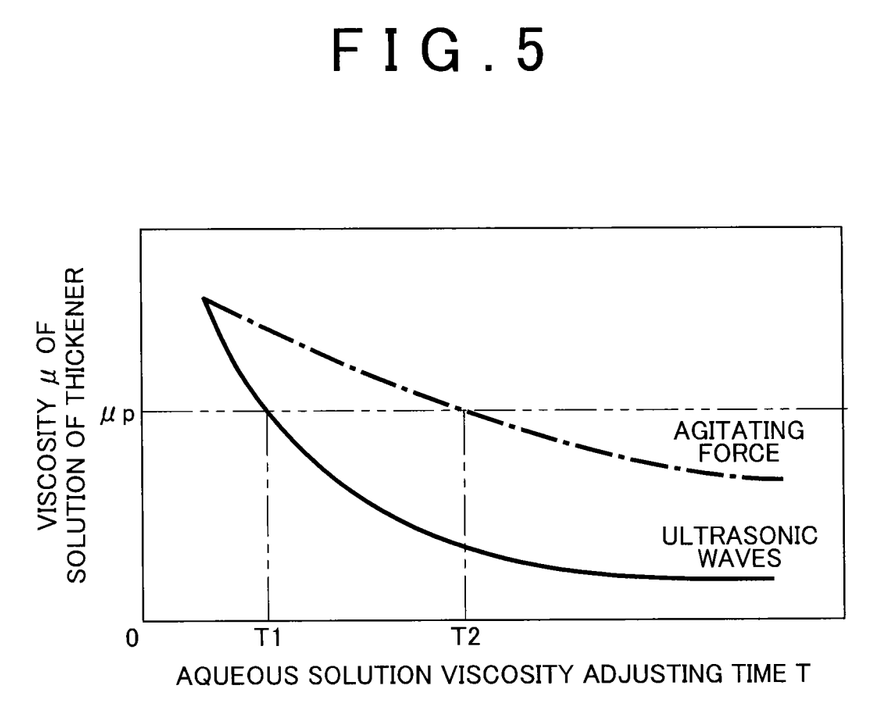
FIG. 5 is a diagram showing changes with time in the adjustment of the viscosity the solution of the thickener with the use of microwaves, and the adjustment of the viscosity of the solution of the thickener with the use of the agitating force.

The adjustment of the viscosity of the solution of the thickener may be performed by cutting the molecular chains of the thickener with the use of shear energy obtained by the agitating force as in the conventional case. However, in the embodiment, the adjustment is performed by cutting the molecular chains of the thickener with the use of collision energy and shear energy that are obtained by the ultrasonic waves. As shown in FIG. 5, the adjustment of the viscosity of the solution of the thickener with the use of the ultrasonic waves is efficient, as compared to the adjustment of the viscosity of the solution of the thickener with the use of the agitating force.

That is, the time T required for adjusting the viscosity μ of the solution of the thickener to a viscosity μp that is a target value can be shortened to T1 (<T2) in the case where the ultrasonic waves are used, while the time T is the time T2 in the case where the agitating force is used. Thus, electric power required for the viscosity adjustment with the use of the ultrasonic waves is lower than electric power required for the viscosity adjustment with the use of the agitating force. The viscosity μ of the solution of the thickener is lowered as the viscosity adjusting time T elapses, and finally becomes the viscosity of water.

Referring again to FIG. 2, data relating to the kneading of the solution of the thickener, the powder of the active substance and the like are read (steps S11), and the solution of the thickener, the powder of the active substance and the like are introduced into the kneading device 4 (step S12). Further, the kneading device 4 is operated (step S13), and it is determined whether a predetermined kneading time has elapsed (step S14). If the predetermined kneading time has elapsed, the operation of the kneading device 4 is stopped (step S15), and the final slurry of the active material is produced.

Specifically, the kneading control portion 54 reads data relating to masses of the solution of the thickener, the powder of the active substance and the like, and data relating to the kneading time, introduces a predetermined amount of the powder of the active substance and the like into the housing 41 through the hopper 44, and also introduces a predetermined amount of the solution of the thickener into the housing 41 through the introduction pipe line 45. Further, the drive motor 43 is driven to rotate the agitating blades 42 for a predetermined kneading time.

Figure 6:
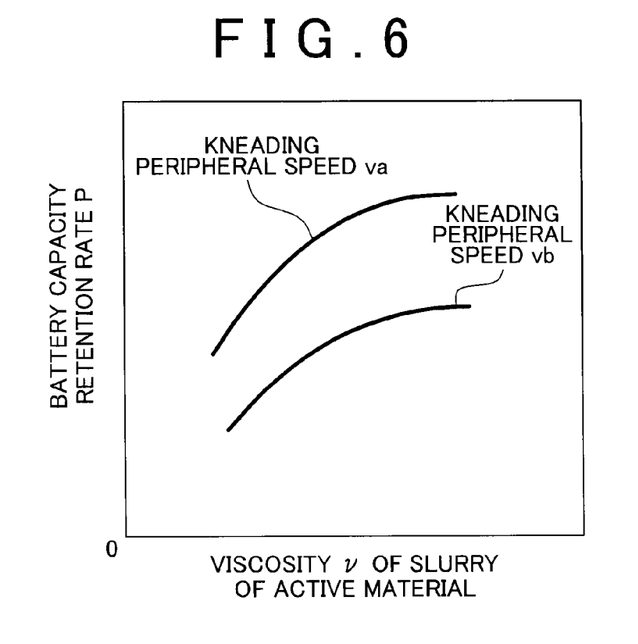
FIG. 6 is a diagram showing a relationship between a capacity retention rate of a battery, that is, durability of the battery (repeated charge and discharge characteristic) and the viscosity of the slurry of the active material.

Next, the setting of the index and the condition for kneading will be described. As shown by the result of experiments in FIG. 6, the capacity retention rate P of the battery, that is, the durability of the battery (repeated charge and discharge characteristic) is increased as the viscosity ν of the slurry of the active material is increased. However, in the case where the kneading peripheral speed ν of the agitating blades 42 of the kneading device 4 is increased (Va<Vb), the capacity retention rate P of the battery is lowered even if the kneading is performed so as to obtain the same viscosity ν of the slurry of the active material. As the kneading peripheral speed ν of the agitating blades 42 is increased, the frequency of collision between the particles of the active material during kneading is increased, and the probability of damage to the particles of the active material is increased. Further, if the particles of the active material are damaged so as to be fragmented into smaller ones, the surface areas are increased, and as a result, electrolysis of electrolyte is accelerated. In view of the foregoing, it is considered that the capacity retention rate P of the battery is adversely influenced by the damage to the particles of the active material.

It is considered that factors responsible for damage to the particles of the active material include the kneading time t for the active material, and the solid content rate (the solid content/(the solid content+the liquid content)) η of the active material, in addition to the kneading peripheral speed ν of the agitating blades 42. Thus, the frequency of collision between the particles of the active material is determined based on a known mean free path with the use of a model in which the particles of the active material perform free motion in a predetermined space. Then, as expressed by the following formula (1), a cumulative collision energy D of the particles of the active material, which is the index for kneading, can be determined by multiplying the kinetic energy $mv^2/2$ of the particles of the active material, by the collision frequency $\sqrt{2} \cdot \eta \cdot \sigma \cdot v$ of the particles of the active material and the kneading time t for the active material. Thus, the damaged state of the particles of the active material, which are damaged by kneading, can be estimated even before the kneading step.

$$D = \left(\frac{mv^2}{2}\right) \times \left(\sqrt{2}\, \eta \sigma v\right) \times (t) \qquad (1)$$

where D is the cumulative collision energy of the particles of the active material, m is a weight of a single particle among the particles of the active material, v is the kneading peripheral speed of the agitating blades 42, η is the solid content rate of the active material, σ is a mean particle diameter of the particles of the active material and t is the kneading time for the active material.

Figure 7:
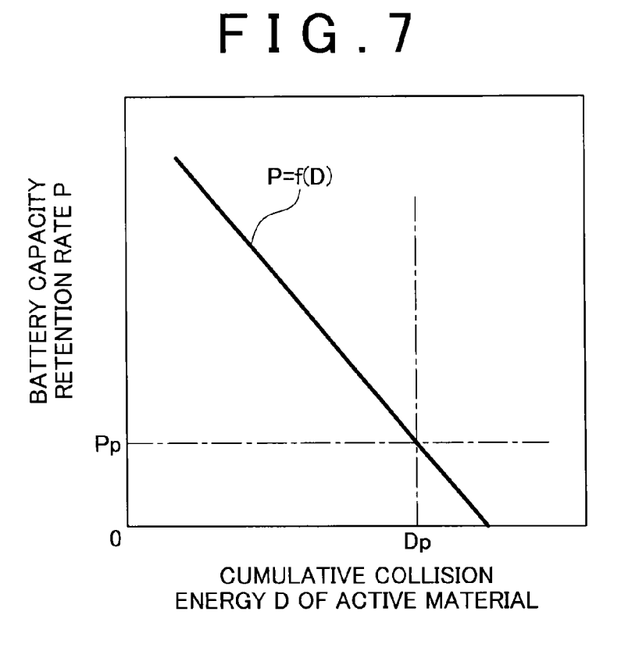
FIG. 7 is a diagram showing a relationship between the capacity retention rate of the battery and cumulative collision energy of the active material.

As shown in FIG. 7, a relationship between the capacity retention rate P of the battery and the cumulative collision energy D of the active material is obtained. This relationship is obtained by adjusting the kneading peripheral speed ν of the agitating blades 42, the solid content rate η of the active material (as to the solid content rate, the ratio between the solid content and the liquid content is changed), and the kneading time t for the active material. The kneading peripheral speed ν, the solid content rate η, and the kneading time t are factors responsible for damage to the particles of the active material. Further, at this stage, a relational expression P=f(D) is obtained, and then, a cumulative collision energy Dp of the active material, which corresponds to a minimum required capacity retention rate Pp of the battery, is determined. A kneading condition in which the cumulative collision energy of the active material becomes equal to or lower than Dp is set. In other words, the kneading peripheral speed v of the agitating blades 42, the solid content rate η of the active material and the kneading time t for the active material are set.

As described above, the frequency of collision between the particles of the active material is determined based on the mean free path of the particles of the active material with the use of the model in which the particles of the active material perform free motion in the predetermined space. Thus, the cumulative collision energy of the active material can be determined by multiplying the frequency of collision between the particles of the active material, by the kinetic energy of the active material and the kneading time for the active material, and can be used as the index for the durability of the battery. Thus, the damaged state of the particles of the active material during kneading can be estimated even before the kneading step. Accordingly, the kneading can be performed in a manner such that the particles of the active material are hardly damaged. Thus, it is possible to produce a battery with high durability.

In the above-described embodiment, the production apparatus 1 for an electric storage material, which includes the dissolution device 2 having the microwave device 22 and the viscosity adjusting device 3 having the ultrasonic device 32, has been described. However, the production apparatus for an electric storage material may include a dissolution device having agitating blades, instead of the dissolution device 2, or the production apparatus for an electric storage material may include a viscosity adjusting device having agitating blades, instead of the viscosity adjusting device 3. Further, the production apparatus for an electric storage material may include a single device that performs both the dissolution and the viscosity adjustment. Further, in the above-described embodiment, the kneading device 4 including the agitating blades 42 has been described. Instead, a kneading device including a screw may be used.

Further, in the above-described embodiment, the case where the active material for a negative electrode in a lithium ion secondary battery has been described. However, the present invention may be also applied for producing an active material for a positive electrode in a lithium ion secondary battery. In this case, the microwaves are applied when a binder such as polyvinylidene fluoride is dissolved in a solvent such as N-methylpyrrolidone, but the ultrasonic waves are not applied when a conductive agent such as acetylene black is mixed into the solution. This is because the viscosity of the solution can be adjusted by changing the amount of the mixed conductive agent such as acetylene black. Further, the electric storage material, to which the present invention is applied, should not be limited to the active material for an electrode in a lithium ion secondary battery. The present invention may be applied to other electric storage materials, for example, a material for a capacitor.

What is claimed is:

1. A production apparatus for an electric storage material that contains at least a thickener and an active substance, comprising:
    a dissolution device that dissolves the thickener in a solvent by applying vibration to the solvent,
    a kneading device that kneads a solution of the dissolved thickener and the active substance;
    a connector that connects the dissolution device to the kneading device such that the dissolved thickener can be transported in the connector to the kneading device,
    a viscosity adjusting device that adjusts a viscosity of the solution of the thickener, wherein the kneading device kneads the solution of the thickener having the adjusted viscosity and the active substance, and
    wherein the viscosity adjusting device communicates with the connector such that the dissolved thickener can be transported in the connector to the viscosity adjusting device before being transported to the kneading device.

2. The production apparatus for an electric storage material according to claim 1, wherein the dissolution device dissolves the thickener in the solvent by applying the vibration to the solvent with use of microwaves.

3. The production apparatus for an electric storage material according to claim 1, wherein the kneading device kneads the solution of the thickener, the active substance and a conductive agent.

4. The production apparatus for an electric storage material according to claim 1, wherein the dissolution device dissolves the thickener in the solvent by applying the vibration to the solvent with use of microwaves.

5. The production apparatus for an electric storage material according to claim 1, wherein the viscosity adjusting device adjusts the viscosity of the solution of the thickener by applying vibration to the solvent with use of ultrasonic waves.

6. The production apparatus for an electric storage material according to claim 4, wherein the viscosity adjusting device adjusts the viscosity of the solution of the thickener by applying vibration to the solvent with use of ultrasonic waves.

7. The production apparatus for an electric storage material according to claim 5, wherein the viscosity adjusting device adjusts the viscosity of the solution of the thickener to a predetermined viscosity range determined based on at least an initial performance of a battery.

8. The production apparatus for an electric storage material according to claim 5, wherein the viscosity adjusting device adjusts the viscosity of the solution of the thickener to a predetermined viscosity range higher, by a predetermined amount, than an upper limit value of a range determined based on at least an initial performance of a battery.

* * * * *